United States Patent
Ryser (10) Patent No.: US 7,243,221 B1
(45) Date of Patent: Jul. 10, 2007

(54) METHOD AND APPARATUS FOR CONTROLLING A PROCESSOR IN A DATA PROCESSING SYSTEM

(75) Inventor: Peter Ryser, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 450 days.

(21) Appl. No.: 10/787,353

(22) Filed: Feb. 26, 2004

(51) Int. Cl.
*G06F 9/00* (2006.01)

(52) U.S. Cl. .......................... 713/1; 718/100; 718/102

(58) Field of Classification Search ................ None
See application file for complete search history.

(56) References Cited

U.S. PATENT DOCUMENTS 6,711,059 B2 * 3/2004 Sinclair et al. ........ 365/185.11

6,711,675 B1 * 3/2004 Spiegel et al. ................ 713/2

OTHER PUBLICATIONS

U.S. Appl. No. 10/393,550, filed Mar. 21, 2003, Yin.

* cited by examiner

*Primary Examiner*—Rehana Perveen
*Assistant Examiner*—Anand B. Patel
(74) *Attorney, Agent, or Firm*—Robert Brush; Michael R. Hardaway (57) ABSTRACT

Method and apparatus for controlling a processor in a data processing system is described. In an example, the processor is maintained in a halt condition in response to reset information received from the data processing system (200) (e.g., initialization of an integrated circuit having a processor embedded therein). At least one memory resource in communication with the processor is configured. The processor is then released from the halt condition.

6 Claims, 6 Drawing Sheets

METHOD AND APPARATUS FOR CONTROLLING A PROCESSOR IN A DATA PROCESSING SYSTEM

FIELD OF THE INVENTION

One or more aspects of the present invention relate generally to data processing systems and, more particularly, to controlling a processor in a data processing system.

BACKGROUND OF THE INVENTION

A data processing system typically includes a processing component, memory, and various support circuits, such as conventional cache, power supplies, clock circuits, data registers, input/output interfaces, bus circuitry, and the like to facilitate operation of the system. The processing component may include one or more processors, such as microprocessors. To place a data processing system in a known initial state, the system is typically equipped with a mechanism that causes the processing component to boot or reset (referred to as a "reset condition"). For example, a processor may include a reset pin. As the reset condition is released, the processing component begins to fetch and execute instructions from a memory address known as the processor reset vector ("reset vector").

The reset vector must point to valid data, such as executable software code. Otherwise, the processing component may execute invalid code, generate an invalid instruction exception, or otherwise enter an undesirable state. The data may include any number of instructions that initialize the system and prepare it for execution of subsequent programming instructions. In some cases, however, the memory resource associated with the reset vector may not be initialized or loaded with the data when the processor exits the reset condition.

For example, it is often desirable to embed a processor within a larger integrated circuit (IC), such as a field programmable gate array (FPGA) or an application specific integrated circuit (ASIC). Such an embedded processor is sometimes referred to as an "embedded processor core" or "embedded core." An embedded processor is typically held in a reset condition unit the host IC is powered and initialized (e.g., initialization of memories, clock circuits, etc. within the IC). Once the IC is initialized, the reset condition is immediately released and the embedded processor begins to fetch and execute instructions mapped to the reset vector.

The data mapped to the reset vector may be stored within internal memory resources of the IC, or within external memory resources accessible by the embedded processor. In some cases, use of the often scarce internal memory resources to store data mapped to the reset vector is undesirable. Moreover, external memory may not be initialized or loaded with data mapped to the reset vector when the embedded processor exits the reset condition, which may result in the embedded processor entering an undesirable state.

Accordingly, there exists a need in the art for a method and apparatus for controlling a processor during initialization of a data processing system.

SUMMARY OF THE INVENTION

An aspect of the invention relates to controlling a processor in a data processing system. A first interface is configured to receive a reset signal from the data processing system. A second interface is coupled to a halt terminal of the processor. A third interface is configured to receive a release signal. A controller is configured to halt said processor in response to the reset signal and release the processor from a halt condition in response to the release signal. For example, the processor may be embedded within an integrated circuit, such as a programmable logic device.

Another aspect of the invention relates to initializing a data processing system having a processor. A halt controller includes a first interface configured to receive a reset signal from the data processing system, a second interface configured to drive a halt terminal of the processor with a halt signal in response to the reset signal, and a third interface. A control unit is configured to generate a release signal to drive the third interface. The release signal is operative to release said processor from a halt condition.

Another aspect of the invention relates to a method of controlling a processor within a data processing system. The processor is maintained in a halt condition in response to reset information from the data processing system. At least one memory resource in communication with the processor is configured. The processor is released from the halt condition. For example, the memory resource(s) may be configured such that data is stored at a location associated with a reset vector of the processor. The processor may be released from the halt condition in response to storage of the data at the reset vector location. Alternatively, the processor may be released from the halt condition in response to elapse of a predefined time period.

Another aspect of the invention relates to a method of controlling a processor within a data processing system. The processor is maintained in a halt condition in response to reset information from the data processing system. An execution cycle of the processor is stopped. The processor is released from the halt condition. At least one memory resource in communication with the processor is configured. The execution cycle of the processor is started. For example, the processor may be stopped by a control unit, such as a debugger. The memory resource(s) may be configured such that data is stored at a location associated with a reset vector of the processor. Alternatively, the memory resources may be configured such that data is stored at a location, and a program counter of the processor is set to the location. The processor may be started in response to configuration of the memory resource(s).

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

A method and apparatus for controlling a processor in a data processing system is described. One or more aspects of the invention are described with respect to controlling initialization of a processor embedded within an integrated circuit (IC), such as a programmable logic device (PLD) (e.g., a field programmable gate array (FPGA) or complex programmable logic device (CPLD)) or mask-programmable logic device (e.g., application specific integrated circuit (ASIC) or application specific standard product (ASSP)). Those skilled in the art will appreciate, however, that the invention also may be used to control discrete processors.

Figure 1:
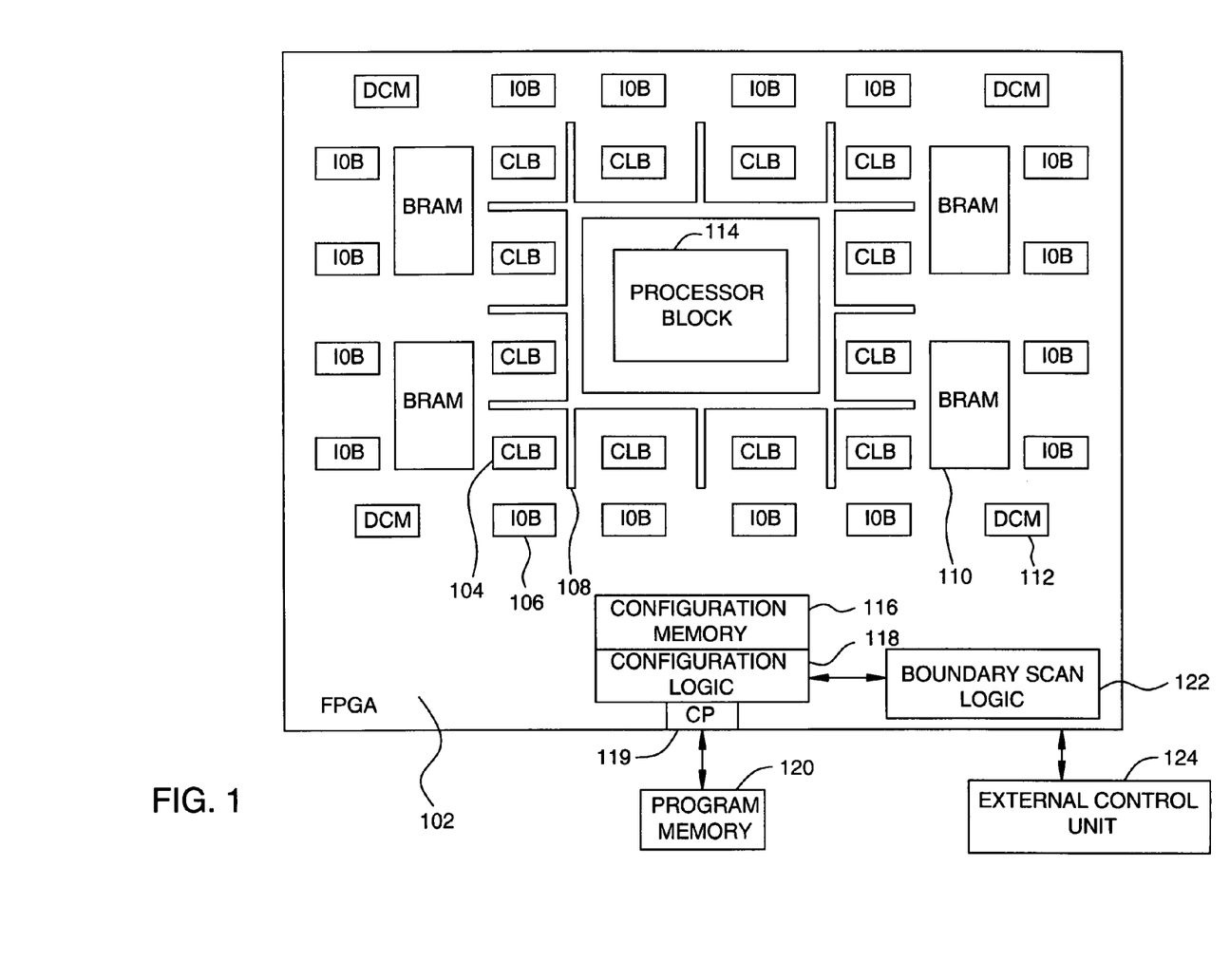
FIG. 1 is a block diagram depicting an exemplary embodiment of a field programmable gate array (FPGA) coupled to program logic.

FIG. 1 is a block diagram depicting an exemplary embodiment of an FPGA 102 coupled to a program memory 120. The FPGA 102 illustratively comprises programmable logic circuits or "blocks", illustratively shown as configurable logic blocks (CLBs) 104, input/output blocks (IOBs) 106, and programmable interconnect 108, as well as configuration memory 116 for programming the FPGA 102 and an embedded processor block 114. The FPGA 102 also comprises various dedicated internal logic circuits, illustratively shown as blocks of random access memory ("BRAM 110"), configuration logic 118, digital clock management (DCM) blocks 112, and boundary scan logic 122. Those skilled in the art will appreciate that the FPGA 102 may include other types of logic blocks and circuits in addition to those described herein.

As is well known in the art, the IOBs 106, the CLBs 104, and the programmable interconnect 108 may be configured to perform a variety of functions. Notably, the CLBs 104 are programmably connectable to each other, and to the IOBs 106, via the programmable interconnect 108. Each of the CLBs 104 may include one or more "slices" and programmable interconnect circuitry (not shown). Each CLB slice in turn includes various circuits, such as flip-flops, function generators (e.g., a look-up tables (LUTs)), logic gates, memory, and like type well-known circuits. The IOBs 106 are configured to provide input to, and receive output from, the CLBs 104.

Configuration information for the CLBs 104, the IOBs 106, and the programmable interconnect 108 is stored in the configuration memory 116. The configuration memory 116 may include static random access memory (SRAM) cells. The configuration logic 118 provides an interface to, and controls configuration of, the configuration memory 116. A configuration bitstream produced from the program memory 120 may be coupled to the configuration logic 118 through a configuration port 119. Alternatively, a configuration bitstream produced from the program memory 120 may be coupled to the configuration logic 118 through the boundary scan logic 122. The configuration process of FPGA 102 is also well known in the art.

The processor block 114 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic of the FPGA 102 (e.g., CLBs 104, IOBs 106). For example, a Microblaze™ soft microprocessor, available from Xilinx, Inc. of San Jose, Calif., may be employed. A hard microprocessor may be implemented using an IBM Power PC, Intel Pentium, AMD Athlon, or like type processor core known in the art. The processor block 114 is coupled to the programmable logic circuitry of the FPGA 102 in a well known manner.

The boundary scan logic 122 may comprise Joint Test Action Group (JTAG) logic in accordance with the well-known IEEE boundary scan standard 1149.1. The processor block 114 may include JTAG pins that may be connected to the boundary scan logic 122 using the programmable interconnect 108. Alternatively, JTAG pins of the processor block 114 may be connected to one or more of the IOBs 106 using the programmable interconnect 108. The configuration bitstream is used to define whether JTAG pins of the processor block 114 are connected to the boundary scan logic 122 or one or more of the IOBs 106.

In either embodiment, an external control unit 124 may interface the FPGA 102 to control operation of the processor block 114. Thus, the external control unit 124 may control operation of the processor block 114 using either the boundary scan logic 122, or one or more IOBs 106, depending on the configuration of the JTAG pins of the processor block 114. The external control unit 124 may be a debugger, testing unit, or the like.

The DCM blocks 112 provide well-known clock management circuits for managing clock signals within the FPGA 102, such as delay lock loop (DLL) circuits and multiply/divide/de-skew clock circuits. For purposes of clarity by example, the FPGA 102 is illustrated with 12 CLBs, 16 IOBs, 4 BRAMs, 4 DCMs, and one processor block. Those skilled in the art will appreciate that actual FPGAs may include one or more of such components in any number of different ratios.

Figure 2:
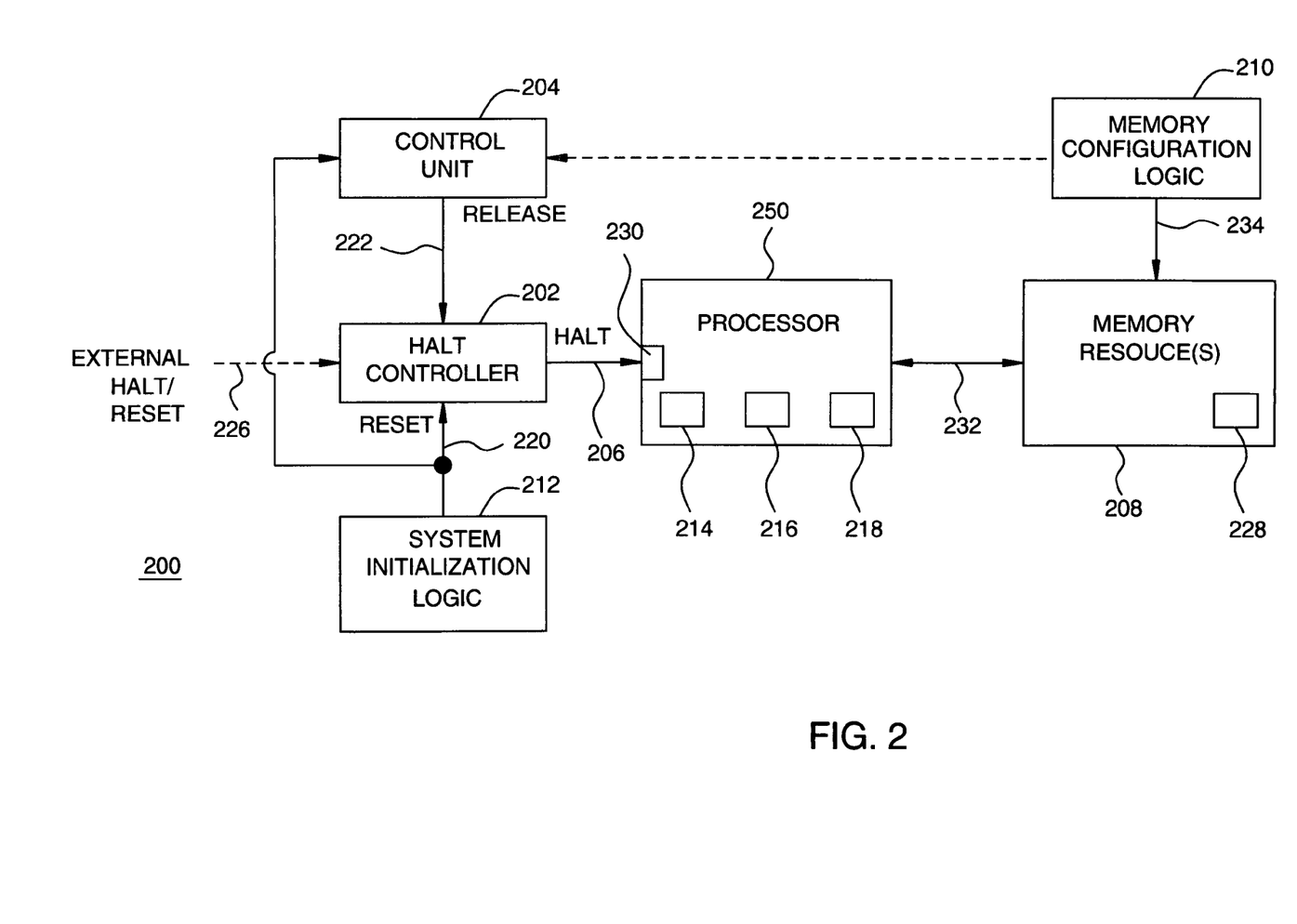
FIG. 2 is a block diagram depicting an exemplary embodiment of a data processing system.

FIG. 2 is a block diagram depicting an exemplary embodiment of a data processing system 200. The data processing system 200 comprises a processor 250, one or more memory resources ("memory resources 208"), a halt controller 202, a control unit 204, system initialization logic 212, and memory configuration logic 210. The halt controller 202 includes an interface 220 coupled to the system initialization logic 212, and interface 222 coupled to the control unit 204, and an interface 206 coupled to a halt terminal 230 of the processor 250.

The memory resources 208 include an interface 232 coupled to the processor 250, and an interface 234 coupled to the memory configuration logic 210. For purposes of clarity by example, the memory resources 208 include two interfaces 232 and 234. It is to be understood, however, that the memory resources 208 may include a signal interface coupled to bus circuitry in communication with both the processor 250 and the memory configuration logic 210.

The system initialization logic 212 comprises various circuits that facilitate operation of the processor 250, such as conventional power supplies, clock circuits, and the like. Notably, the system initialization logic 212 generates a reset signal in response to various trigger events. In operation, the halt controller 202 halts the processor 250 in response to a reset signal generated by the system initialization logic 212. The halt controller 202 is configured to halt the processor 250 using the interface 206 that drives the halt terminal 230. Thus, the processor 250 is halted, rather than reset, in response to a reset signal generated by the data processing system 200. In one embodiment, the halt controller 202 may include one or more additional interfaces (e.g., the interface 226) for receiving external halt signals or external reset signals that are not asserted by the system initialization logic 212 (e.g., halt or reset signals generated by other circuits within the data processing system 200 that are not related to system initialization).

The memory configuration logic 210 is configured to load one or more of the memory resources 208 with data. Notably, the memory resources 208 include a location 228 associated with a reset vector 218 of the processor 250. The reset vector 218 includes the address of the location 228. Before the execution cycle of the processor 250 begins, a program counter 216 of the processor 250 is set to the address indicated by the reset vector 218. For purposes of clarity by example, the memory resources 208 are shown external to the processor 250. It is to be understood, however, that the memory resources 208 may also include memory 214 disposed within the processor 250, such as processor registers or processor cache. Notably, the location 228 may be disposed within the memory 214.

The memory configuration logic 210 is configured to store data in at least the location 228. For example, the memory configuration logic 210 may store executable code at the location 228. Alternatively, the memory configuration logic 210 may store other types of data at the location 228. For example, such data may include sequences of read/write operations to registers that trigger particular actions (e.g., the starting of a motor controlled by the data processing system 200). In any case, the memory configuration logic 210 may configure the memory resources 208 in response to a reset signal generated by the system initialization logic 212. Since the processor 250 is halted by the halt controller 202, the memory configuration logic 210 may configure the memory resources 208 before the processor 250 begins its execution cycle by fetching data from the location 228.

The control unit 204 is configured to generate a release signal, which is coupled to the halt controller 202 via the interface 222. The release signal is operative to cause the halt controller 202 to release the processor 250 from a halt condition. The control unit 204 may produce the release signal in response to various trigger events. Notably, the control unit 204 may be configured to generate a release signal after the memory configuration logic 210 has configured the memory resources 208. For example, in one embodiment, the control unit 204 may be responsive to the reset signal generated by the system initialization logic 212. After elapse of a pre-defined time period from the occurrence of the reset signal, the control unit 204 generates the release signal. Alternatively, the control unit 204 may be responsive to a status signal from the memory configuration logic 210. The memory configuration logic 210 may generate the status signal upon completion of the configuration of the memory resources 208.

In one embodiment of the invention, the processor 250 may embedded within an IC, such as the FPGA 102 shown in FIG. 1. For example, the processor 250 may comprise an IBM Power PC 405 core and the halt terminal 230 may be the DBGC405DEBUGHALT pin of the processor 250. The halt controller 202 may comprise dedicated circuitry embedded within the FPGA 102, or may be defined using programmable logic of the FGPA 102.

The system initialization logic 212 may comprise the initialization logic of the FPGA 102. For example, the FPGA 102 may generate a reset signal after a configuration bitstream has been loaded and circuitry therein has been initialized (e.g., the DCMs have been locked, the BRAM has been initialized, and the like). The control unit 204 may also be embedded within the FPGA 102 as either dedicated circuitry or defined using programmable logic. Alternatively, the control unit 204 may be disposed external to the FPGA 102, such as within the external control unit 124.

The memory configuration logic 210 may be embedded within the FPGA 102 as either dedicated circuitry or defined using programmable logic. Alternatively, the memory configuration logic 210 may be disposed external to the FPGA 102, such as within the external control unit 124. The memory resources 208 may comprise one or more of external memory, BRAM, on-chip memory (OCM), processor cache, processor registers, FPGA internal registers, and external register.

Figure 3:
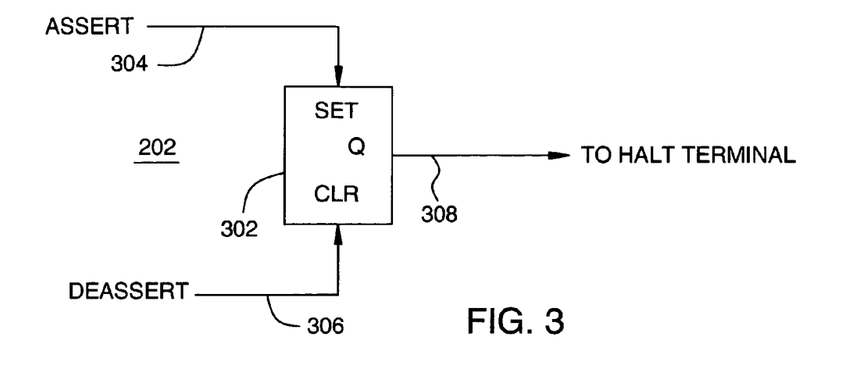
FIG. 3 is a block diagram depicting an exemplary embodiment of a halt controller shown in FIG. 2.

FIG. 3 is a block diagram depicting an exemplary embodiment of the halt controller 202 of FIG. 2 and may be understood with simultaneous reference therewith. The halt controller 202 comprises a flip-flop 302, an assert terminal 304, a deassert terminal 306, and an output terminal 308. The assert terminal 304 is coupled to a set port of the flip-flop 302. The deassert terminal 306 is coupled to a clear port of the flip-flop 302. An output of the flip-flop 302 is coupled to the output terminal 308, which drives the halt terminal 230 of the processor 250.

In this illustrative embodiment, the halt condition of the processor 250 is asserted by driving the assert terminal 304 of the flip-flop 302 with a logically high signal. The halt condition of the processor 250 is deasserted by driving the deassert terminal 306 of the flip-flop 302 with a logically high signal. Initially, the flip-flop 302 may be pre-set such that the halt controller 202 is pre-asserted. Thus, the processor 250 will be in the halt condition until released by the control unit 204.

Figure 4:
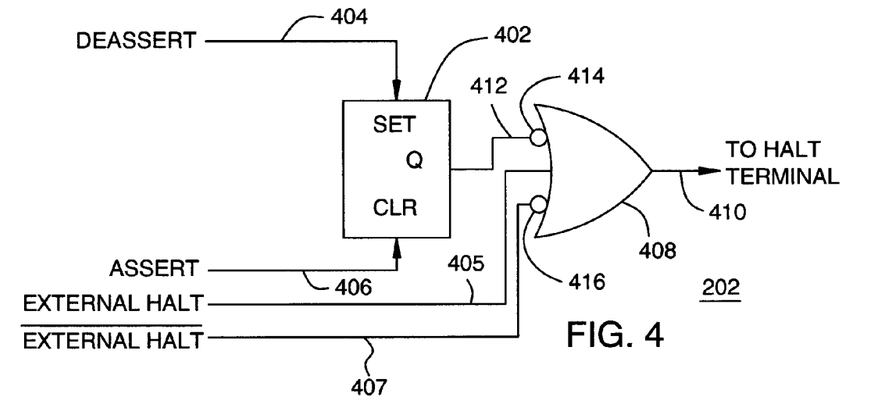
FIG. 4 is a block diagram depicting another exemplary embodiment of a halt controller shown in FIG. 2.

FIG. 4 is a block diagram depicting another exemplary embodiment of the halt controller 202 of FIG. 2 and may be understood with simultaneous reference therewith. In the present embodiment, the halt controller 202 comprises a flip-flop 402, an assert terminal 404, a deassert terminal 406, an external halt terminal 405, a negated external halt terminal 407, an OR gate 408, and an output terminal 410. The assert terminal 404 is coupled to a clear port of the flip-flop 402. The deassert terminal 406 is coupled to a set port of the flip-flop 302. An output terminal 412 of the flip-flop 402 is coupled to an input port of OR gate 408 through an inverter 414. Alternatively, the output terminal 412 may be logically negated within the flip-flop 402, in which case the inverter 414 may be omitted. Another input of the OR gate 408 is coupled to the external halt terminal 405. Yet another input of the OR gate 408 is coupled to the negated external halt terminal 407 through an inverter 416. For example, the external halt signal 405 and the negated external halt signal 407 may be received from external pins of the FPGA 102 of FIG. 1. An output of the OR gate 408 is coupled to the output terminal 410, which drives the halt terminal 230 of the processor 250.

The halt condition of the processor 250 is asserted by driving any of the external halt signals 405 and 407 and the output terminal 412 to the active state. The halt condition of the processor 250 is deasserted by driving all of the external halt signals 405 and 407 and the output terminal 412 to the inactive state. Those skilled in the art will appreciate that other configurations may be employed to implement the halt controller 202 in addition to those shown in FIGS. 3 and 4, which use any number and configuration of logic gates and logic elements known in the art.

Figure 6:
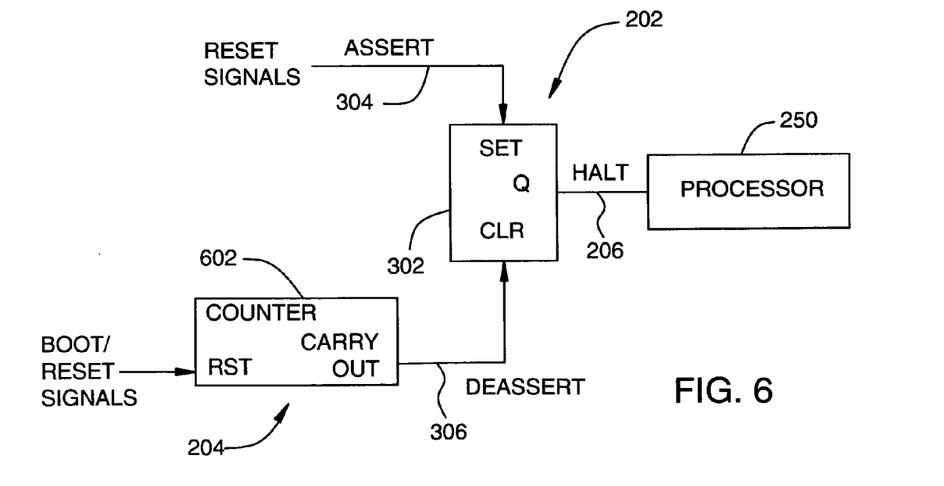
FIG. 6 is a block diagram depicting an illustrative embodiment of an arrangement for the control unit and the halt controller of FIG. 2.

FIG. 6 is a block diagram depicting an illustrative embodiment of an arrangement for the control unit 204 and the halt controller 202 of FIG. 2. In this illustrative embodiment, the halt controller 202 is configured as shown in FIG. 3. Elements of FIG. 6 that are the same or similar to those shown in FIGS. 2 and 3 are designated with identical reference numerals and are described in detail above. As shown, the control unit 204 comprises a counter 602. A carry out port of the counter 602 is coupled to the deassert terminal 306. In one embodiment, the assert terminal 304 may be driven with a logically inactive signal. Alternatively, the assert terminal 304 may be driven with a reset signal.

In operation, the halt controller 202 is pre-asserted such that the processor 250 will remain in the halt condition. Upon system reset, the counter 602 begins counting clock cycles. For example, a reset port of the counter 602 may be set in accordance with power-up or reset of an FPGA. When the counter 602 flows over, the carry out port of the counter 602 will drive the deassert terminal 306 to deassert the halt controller 202. Once deasserted, the halt controller 202 releases the processor 250 from the halt condition.

The configuration shown in FIG. 6 may be used to maintain the halt condition for a specific period of time after a system reset or boot. If the assert terminal 304 is driven by a reset signal, such as the system reset signal of the FPGA, then the halt condition may be maintained as long as reset is active plus the time until the counter 602 flows over for the first time. Such a configuration may be used to keep the processor halted for a specific period of time after a system reset or boot.

Figure 5:
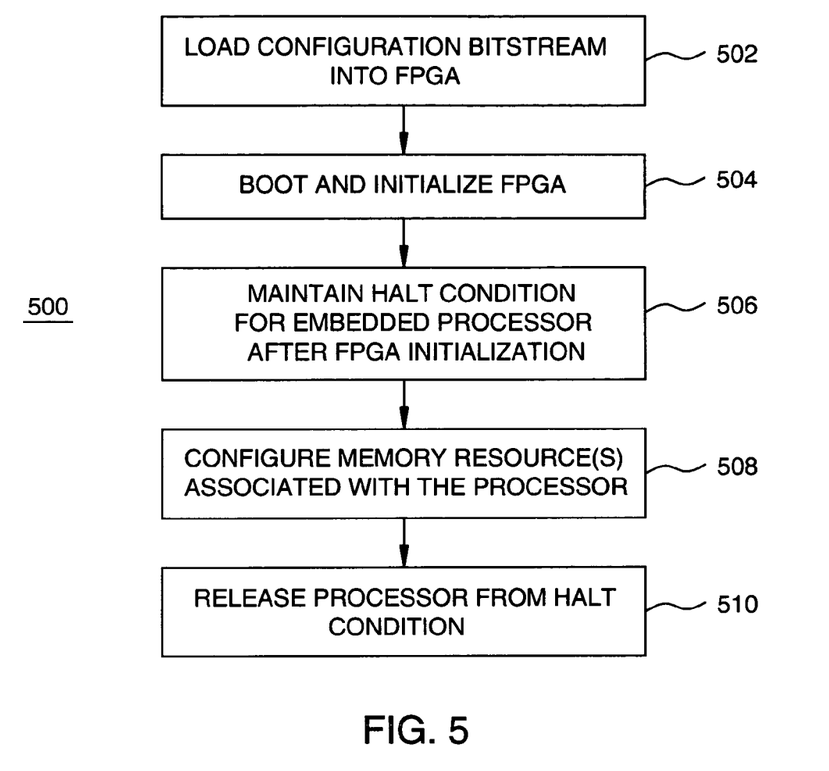
FIG. 5 is a flow diagram depicting an exemplary embodiment of a process for controlling a processor in a data processing system.

FIG. 5 is a flow diagram depicting an exemplary embodiment of a process 500 for controlling a processor in a data processing system. Aspects of the process 500 may be understood with simultaneous reference to FIGS. 1 and 2. The process 500 begins at step 502, where a configuration bitstream is loaded into the FPGA 102. At step 504, the FPGA 102 is started ("booted") and initialized. At step 506, a halt condition for the processor 250 is maintained after the FPGA 102 is initialized. For example, the halt controller 202 may be pre-set to drive the halt terminal 230 with a halt signal. Alternatively, the FPGA 102 may generate a reset signal during initialization at step 504 and the processor 250 may be halted in response to the reset signal, as described above.

At step 508, one or more memory resources associated with the processor 250 may be configured while the processor is halted. For example, a memory resource mapped to the reset vector of the processor may be loaded with data (e.g., executable software code) by a source, such as memory configuration logic 210. At step 510, the processor 250 is released from the halt condition. By halting the processor 250 after initialization of the FPGA 102, sufficient time is allowed for configuration of the memory resources 208 associated with the processor 250. For purposes of clarity by example, the process 500 has been described with respect to a processor embedded within an FGPA. It is to be understood, however, that the processor may be embedded within other types of ICs, or may be a discrete processor, in which case steps 502 and 504 generally represent a reset within a data processing system.

Figure 9:
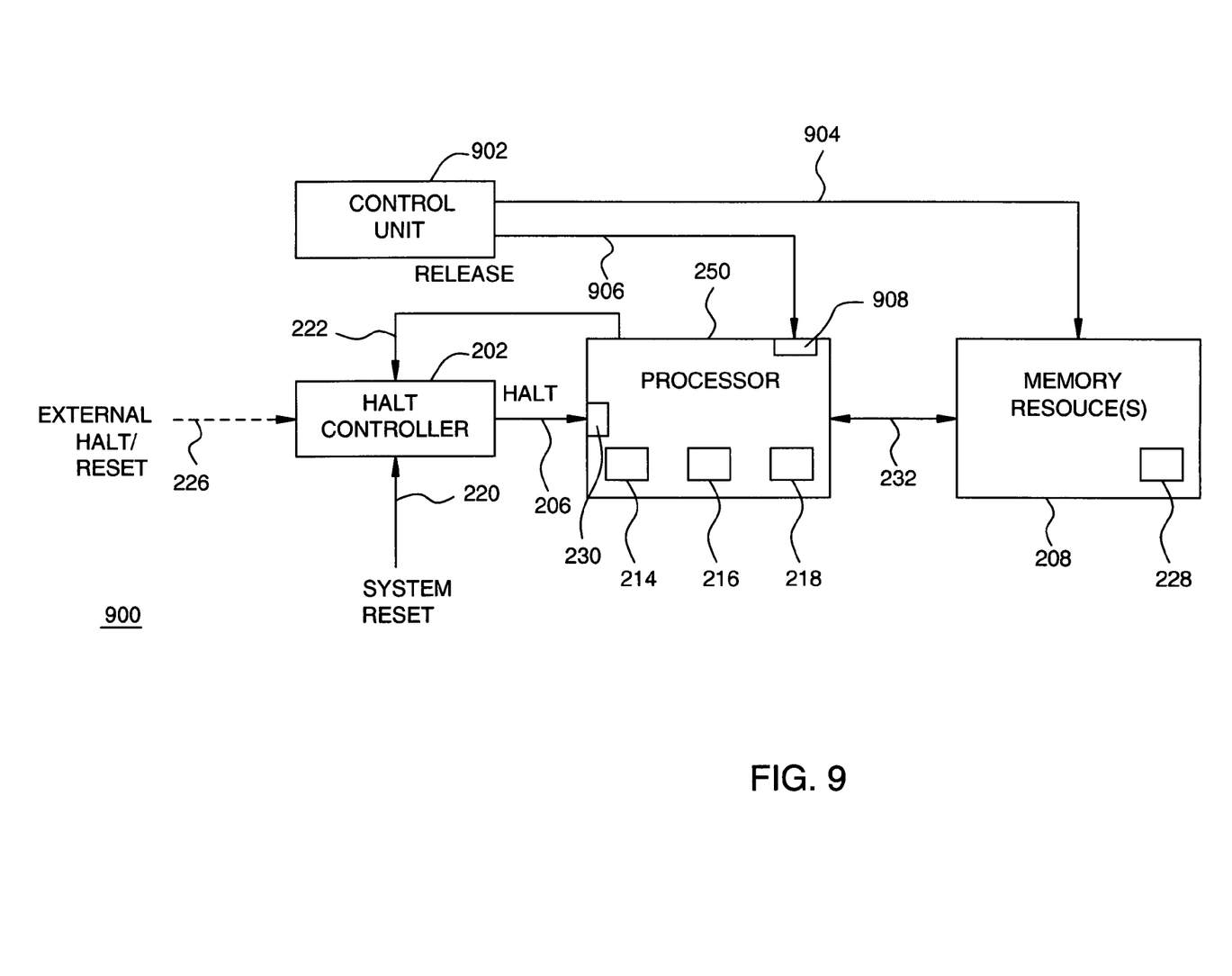
FIG. 9 is a block diagram depicting another exemplary embodiment of a data processing system.

FIG. 9 is a block diagram depicting another exemplary embodiment of a data processing system 900. Elements of the data processing system 900 that are the same or similar to those of the data processing system 200 shown in FIG. 2 are designated with identical reference numerals and are described in detail above. In the data processing system 900, a control unit 902 is coupled to a control interface 908 of the processor 250 via a path 906, and an interface of the memory resources 208 via a path 904. While the control unit 902 is shown as being coupled to the memory resources 208 via the path 904, those skilled in the art will appreciate that the control unit 902 may be coupled to the memory resources 208 via a common bus with the processor 250. In addition, the processor 250 is coupled to the interface 222 of the halt controller 202.

In operation, the control unit 902 is capable of controlling the processor 250 through the control interface 908. Notably, the control unit 902 is capable of controlling the execution cycle of the processor 250. The control unit 902 is also capable of updating the program counter 216 to a different start address than that of the reset vector 218. In addition, the control unit 902 may cause the processor 250 to generate a release signal to be coupled to the interface 222 of the halt controller 202.

For example, the control interface 908 may be a JTAG interface, as described above. The control unit 902 may stop and start the execution cycle of the processor 250 as desired and may cause the processor 250 to generate a release signal to be coupled to the halt controller 202. In one embodiment, the processor 250 is embedded within an IC (e.g., the FPGA 102). The control unit 902 may comprise a debugger (e.g., the external control unit 124) or may be configuration logic of the IC (e.g., the configuration logic 118). The control unit 902 is also capable of loading the memory resources 208 with data via the path 904. For example, the control unit 902 may load data into the location 228 associated with the reset vector 218, as well as other locations within the memory resources 208.

Figure 7:
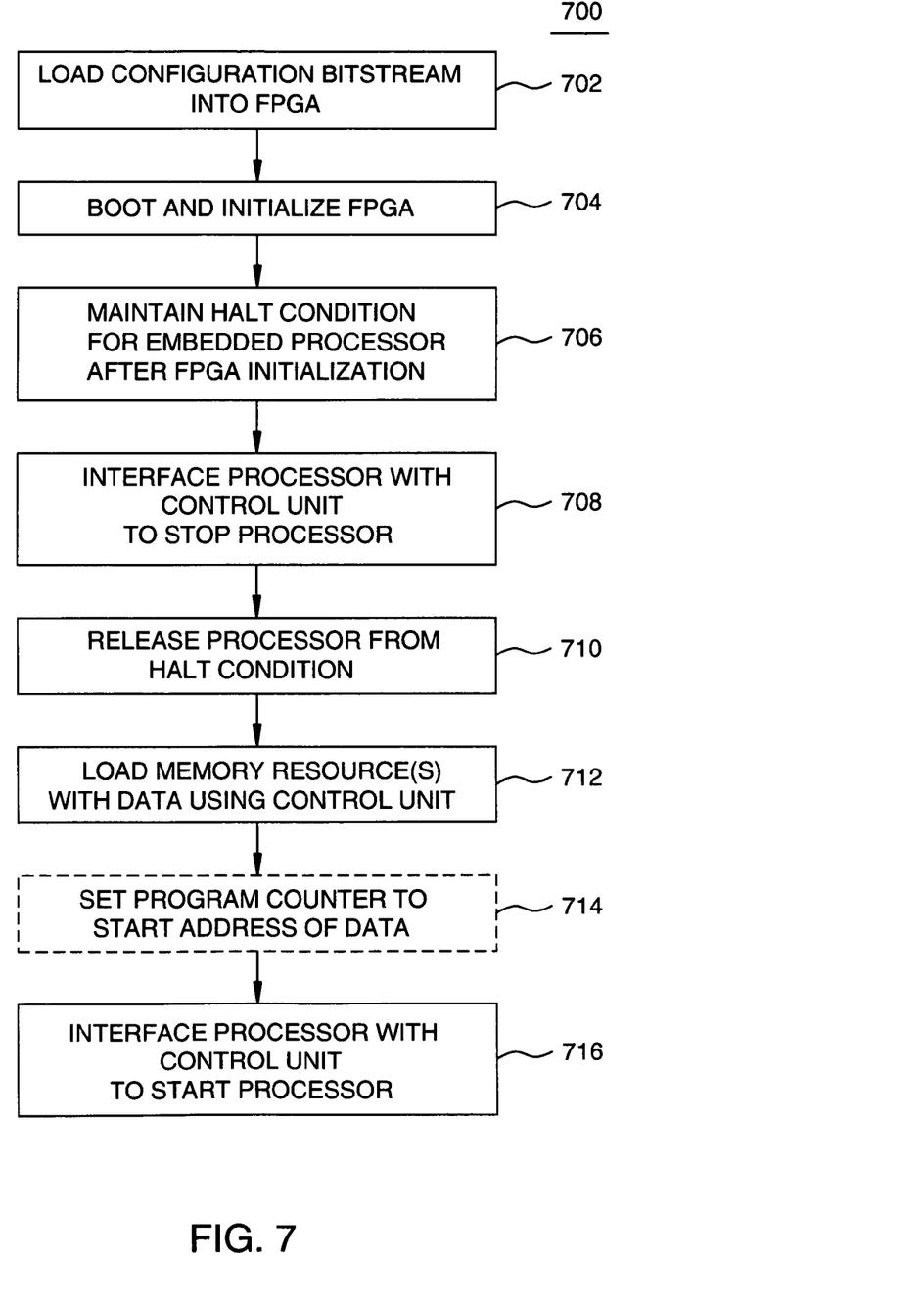
FIG. 7 is a flow diagram depicting another exemplary embodiment of a process for controlling a processor in a data processing system.

FIG. 7 is a flow diagram depicting another exemplary embodiment of a process 700 for controlling a processor in a data processing system. Aspects of the process 700 may be understood with simultaneous reference to FIGS. 1 and 9. The process 700 begins at step 702, where a configuration bitstream is loaded into the FPGA 102. At step 704, the FPGA 102 is booted and initialized. At step 706, a halt condition for the processor 250 is maintained after the FPGA 102 is initialized. For example, the halt controller 202 may be pre-set to halt the processor 250. Alternatively, the FPGA 102 may generate a reset signal during initialization at step 704 and the processor 250 may be halted in response to the reset signal, as described above.

At step 708, the control unit 902 interfaces with and stops the processor. For example, external debug logic or configuration logic may interface with and control the processor 250 through the control interface 908 (e.g., JTAG interface). At step 710, the halt condition maintained at step 706 is released. The processor 250 is still stopped by the control unit 902. At step 712, the control unit 902 loads one or more memory resources associated with the processor 250 (e.g., the memory resources 208) with data (e.g., executable software code) while the processor 250 is stopped. At optional step 714, the program counter 216 of the processor 250 may be set to the start address of the loaded data. Alternatively, the data may be loaded into the location 228 of the memory resources 208 at step 712, which is associated with the reset vector 218. At step 716, the processor 250 is activated by the control unit.

For purposes of clarity by example, the process 700 has been described with respect to a processor embedded within an FGPA. It is to be understood, however, that the processor may be embedded within other types of ICs, or may be a discrete processor, in which case steps 702 and 704 generally represent a reset within a data processing system.

Figure 8:
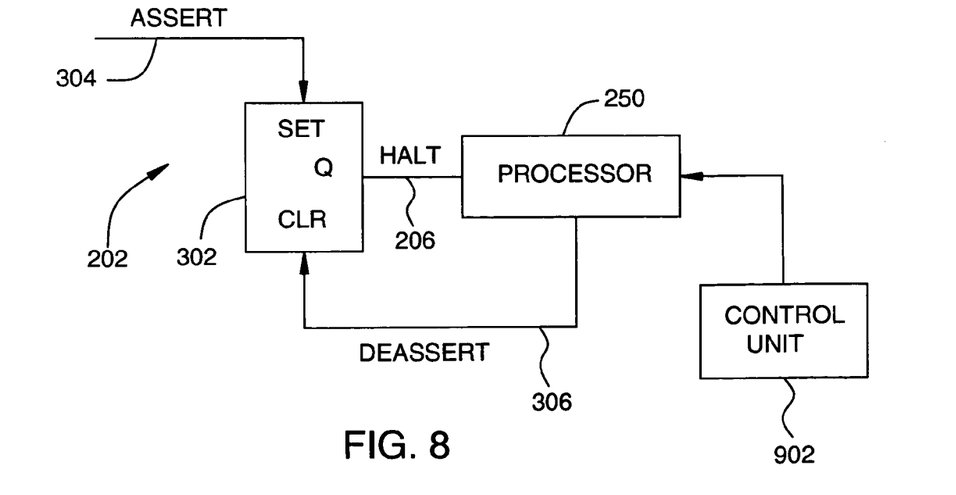
FIG. 8 is a block diagram depicting another illustrative embodiment of an arrangement for the control unit and the halt controller of FIG. 9.

FIG. 8 is a block diagram depicting another illustrative embodiment of an arrangement for the control unit 902 and the halt controller 202 of FIG. 9. In this illustrative embodiment, the halt controller 202 is configured as shown in FIG. 3. Elements of FIG. 8 that are the same or similar to those shown in FIGS. 9 and 3 are designated with identical reference numerals and are described in detail above. As shown, the processor 250 is configured to drive the deassert terminal 306 of the halt controller 202. The control unit 902 interfaces with the processor 250 (e.g., through the control interface 908). Through the control interface 908, the control unit 902 is capable of controlling operation of the processor 250 (e.g., starting the processor and stopping the processor). In one embodiment, the control unit 902 may comprise external debug logic capable of manual interaction with the processor 250. In another embodiment, the control unit 902 may comprise configuration logic and may control the processor 250 through a concatenated hardware and software bitstream.

In operation, the halt controller 202 is pre-asserted such that the processor 250 will remain in the halt condition upon system reset. After system reset, the control unit 902 stops the processor 250. The control unit 902 then releases the halt condition imposed by the halt controller 202 through an instruction to the processor 250. For example, the processor 250 may comprise an IBM Power PC 405 core, and the control unit 902 may pulse the C405 DBGMSRWE signal of the processor 250, which is connected to the deassert terminal 306 of the halt controller 202. After the halt condition has been released, the control unit 902 may start the processor 250, as desired (e.g., after memory resources 208 have been configured with data for the processor 250). In addition, the control unit 902 may set the program counter 216 of the processor 250 to a location other than the location 228.

The configuration of FIG. 8 is advantageous when configuring software for the processor 250 after an FPGA is booted and initialized. In addition, the present configuration enables the processor 250 to boot without having executable code at the reset vector, since the program counter 216 is made to point to the start address of the data.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. A method of controlling a processor within a data processing system, comprising:
   maintaining said processor in a halt condition in response to reset information from said data processing system;
   stopping an execution cycle of said processor;
   releasing said processor from said halt condition, said execution cycle remaining stopped;
   configuring at least one memory resource in communication with said processor after the processor is released from the halt condition and while the execution cycle of the processor is stopped; and
   starting said execution cycle of said processor.

2. The method of claim 1, wherein said configuring step comprises:
   storing data in said at least one memory resource at a location associated with a reset vector of said processor.

3. The method of claim 2, wherein said data comprises code configured to be executed by said processor.

4. The method of claim 2, wherein said processor is started in response to storage of said data.

5. The method of claim 1, wherein said configuring step comprises:
   storing data in said at least one memory resource at a location; and
   setting a program counter of said processor to said location.

6. The method of claim 1, wherein said processor is embedded within an integrated circuit, and wherein said reset information is generated in response to initialization of said integrated circuit.

* * * * *